June 25, 1963 R. GIESE 3,095,188

SEAT BACK REST WITH ADJUSTABLE SPRING RATE

Filed July 13, 1961 2 Sheets-Sheet 1

RALF GIESE
INVENTOR.

BY John C. Faulkner
John J. Roethel

ATTORNEYS

June 25, 1963 R. GIESE 3,095,188
SEAT BACK REST WITH ADJUSTABLE SPRING RATE
Filed July 13, 1961 2 Sheets-Sheet 2

RALF GIESE
INVENTOR.

BY John R. Faulkner
John J. Loethel
ATTORNEYS

United States Patent Office 3,095,188
Patented June 25, 1963

3,095,188
SEAT BACK REST WITH ADJUSTABLE SPRING RATE
Ralf Giese, Cologne, Germany, assignor to Ford Motor Company, Dearborn, Mich., a corporation of Delaware
Filed July 13, 1961, Ser. No. 123,822
Claims priority, application Germany Nov. 25, 1960
5 Claims. (Cl. 267—89)

This invention relates generally to a spring seat structure for motor vehicles, and more particularly to a cushioned seat back rest structure incorporating means for adjusting the supporting effect of the cushion springs.

For health reasons, especially to avoid injury to the spine, it is desirable to provide seats for the driver and passengers of motor vehicles which correspond exactly to the anatomy of the human body. Most important is the correct support of the lower part of the spine. The construction of a universally satisfactory seat structure is rather difficult because of the differences in individual body sizes and proportions. Also, in order to avoid fatigue it is desirable for the driver to be able to alter his seat position. A correct support must be guaranteed for every seat position.

In conventional vehicle seat installations, especially those involving the driver's seat, provision is made for adjustment of the seat structure height and for the distance to the steering wheel and operating pedals. Frequently, provision is also made for adjustment of the inclination of the back rest. It has also been suggested that the height of the pedals be adjustable. All of these measures, however, do not result in adjustment of the spine support to the individual person.

It is also conventional to use auxiliary back rests adapted to be disposed on the seat rest surface and retained thereon by fastening belts or the like. Such auxiliary back rests are frequently designed so as to be adjustable as to their position on the seat and as to their camber. This permits adjustment to the anatomy of the seat occupant, at least within certain limits. These auxiliary back rests, however, have several disadvantages. It is not possible to adjust the position of such back rest devices while the vehicle is in motion. Thus the necessary adjustment cannot be made expeditiously. Since such back rests are not integral components of the vehicle, the necessary adaptation between design of the back rest and the actual seat cannot be made. Also, only few vehicle owners are willing to buy such additional equipment. Such auxiliary back rest devices are also felt to be rather disturbing from the aesthetic point of view.

It has been suggested that the individual contour of the back rest could be achieved without the use of separate or auxiliary back rest devices by the use of one or more air cushions disposed beneath the fabric covering the back rest structure. The air cushions would be relatively inflatable to provide the desired supporting effect. This arrangement also has several disadvantages. Air cushions are susceptible to mechanical damage. They also spring not only in the direction of resistance to the weight of the driver but also laterally so that the driver has no positive support. And unless a source of air under pressure is provided within the vehicle, adjustment during driving is not possible.

It is an object of the present invention to provide a vehicle seat which guarantees effective support, especially of the lower part of the spine, and which can be adjusted to individual requirements during movement of the vehicle. The seat embodying the present invention also gives the driver solid lateral support and has an aesthetic appearance.

These objectives are attained by a construction and arrangement in which one or more springs are disposed interiorly of the back rest, the springs being curved toward the surface. The ends of each such spring or springs remote from the back support are movable by an actuating element so that a desired spring stress within predetermined limits may be imposed. The actuating element is readily accessible and may be operated without requiring interruption of the operation of the vehicle.

Other objects and advantages of the present invention will be made more apparent as this description proceeds, particularly when considered in connection with the accompanying drawings, wherein.

Figure 1:
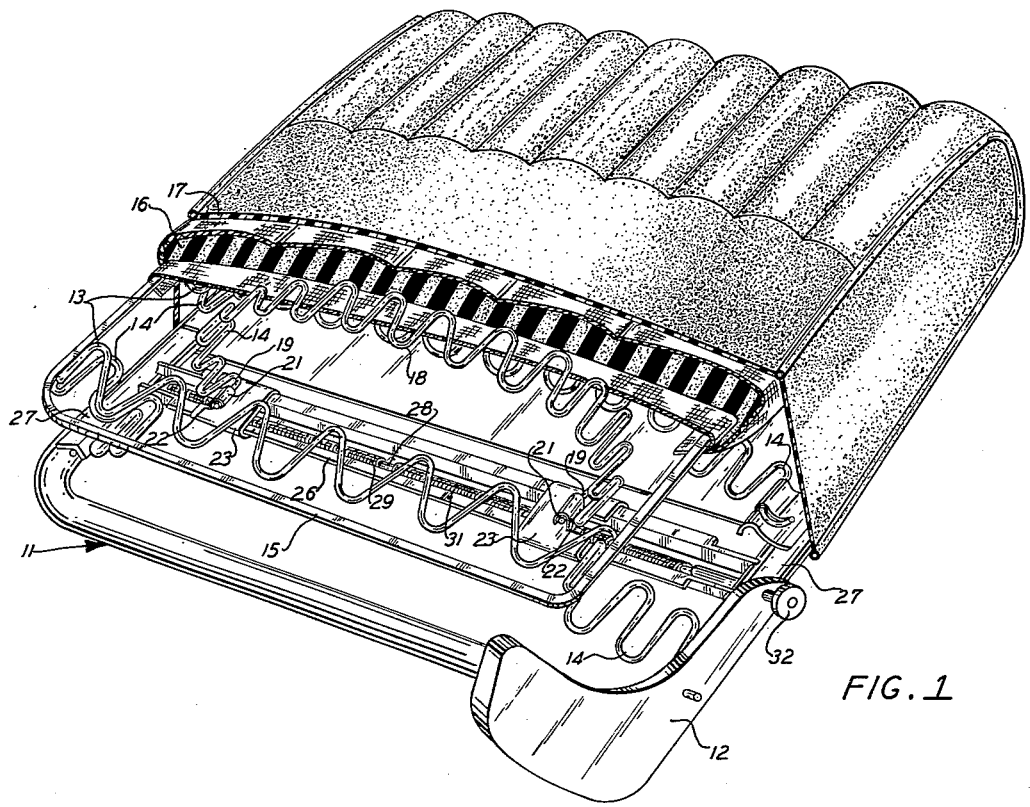
FIG. 1 is a schematic isometric view, in part sectional, of a seat back rest according to the present invention.

The back rest structure embodying the present invention comprises a tubular frame 11 which is adapted to be swingably mounted on a conventional horizontal seat frame (not shown) by means of a support arm 12. Sinuous or formed wire spring elements 13 are disposed over the frame 11, the conventional fishmouth ends 14 of the spring elements supporting an upholstery frame 15. The sinuous spring elements 13 are illustrated as being horizontally disposed and slightly curved outwardly or toward the back rest surface. The sinuous spring elements 13 are disposed for the greater part in parallel and close relationship to each other. The springs 13 are covered by a layer of upholstery material 16, such as foam rubber or other conventional padding material, and a covering material 17.

In the lower portion of the seat rest the space between two of the spring elements 13 is somewhat enlarged, this space being somewhat exaggerated in FIG. 1 for clarity. A special supporting spring element 18 is disposed in this space. The spring element 18 is also a sinuous or formed wire element. Although only one special spring 18 is illustrated, it should be understood that several of these springs may be vertically interspaced in any desired parallel arrangement. The special support spring element 18 is, as are the regular spring elements 13, curved toward the back rest surface. The degree of curvature is, however, adjustable. It will be noted that each end 19 of the spring 18 engages a reversely bent edge portion 21 on an upstanding flange 22 on a carrier or slide 23, there being two of these carriers or slides 23. The carriers or slides 23 have depending portions 24 provided with a threaded hole 25 therethrough.

The carriers or slides 23 are slidably disposed on a channel 26 extending between the vertical members 27 of the seat frame 11. A rotatable spindle 28 having two threaded sections 29 and 31 extends longitudinally of the channel 26, one end of the spindle projecting through a vertical frame member 27 of the seat frame 11 and having a hand grip or knob 32 thereon. The threaded sections 29 and 31, the one with a right-hand and the other with a left-hand thread, are in engagement with the threaded walls of the holes 25 in the slides 23, respectively.

Figure 4:
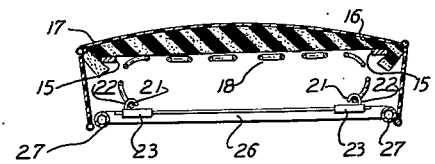
FIGS. 4 and 5 are horizontal sections through the back rest illustrating the adjustable spring at its two extreme positions of adjustment.
Figure 5:
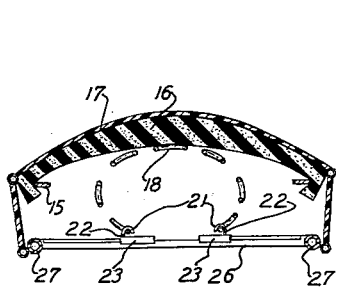
Figure 2:
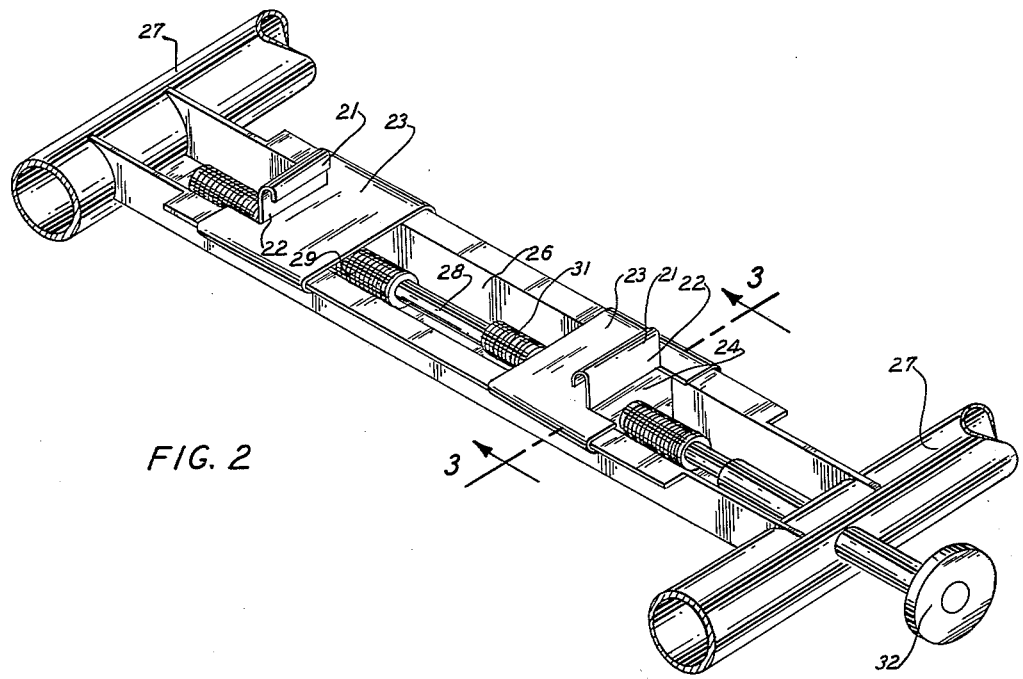
FIG. 2 is an enlarged view of the spring rate adjustment mechanism embodying the present invention.
Figure 3:
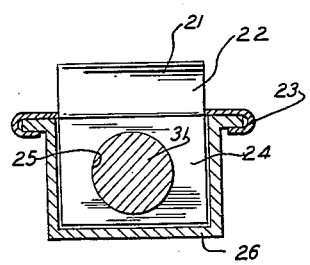
FIG. 3 is a cross section taken substantially on the line 3—3 of FIG. 2.

From the foregoing it is evident that the contour or shape of the rest surface of the lower part of the back rest is not only given by the conventionally mounted spring elements 13 but is substantially enhanced by the center section of the support spring 18. It is also evident from the above that by rotation of the spindle 28 through manipulation of the knob 32, an opposite movement of the two carriers or slides 23 may be caused. Through rapprochement and separation of the spring ends 19, the curve of the element 18 is changed. FIG. 4 illustrates the spring in a slightly curved state; whereas FIG. 5 shows a more curved state. The range of adjustment of the carriers or slides 23 is preferably such that in their most outward position the center part of the spring element 18 has substantially the same curvature as that of the adjacent spring elements 13, whreeas in the innermost position of the slides 23 the spring element 18 has a definite back supporting effect which meets all individual requirements. A back rest is thus provided which gives a flat, relaxed sitting position required on driving over highways where a conventional back support would only be uncomforable, as well as an upward sitting position for which a proper back support is rather indispensable. The back supporting effect may be ridgelessly adjusted to the personal anatomic requirements, the control knob 32 being easily accessible even during operation of the vehicle.

It will be understood that the invention is not to be limited to the exact construction shown and described, but that various changes and modifications may be made without departing from the spirit and scope of the invention as defined in the appended claims.

I claim:
1. A seat structure comprising a main frame and an auxiliary frame,
  a plurality of elongated spring elements having end portions supporting said auxiliary frame in spaced relationship to said main frame,
  said elongated spring elements being disposed in substantially parallel relationship to each other and having the center portions thereof displaced outwardly from the plane of said auxiliary frame,
  at least one additional elongated spring element interposed between a pair of said first mentioned spring elements and having its center portion displaced outwardly from the plane of said auxiliary frame,
  said additional spring element being supported at each of its ends on support members displaceable in the plane of said main frame,
  and means operative to displace said support members toward or from each other to vary the displacement of the center portion of said additional spring element,
  the displacement of the center portion of said additional spring element when said support members are at a maximum displacement from each other being substantially the same as that of the center portions of said first mentioned spring elements,
  said additional spring element center portion being displaced outwardly from the plane of said auxiliary frame member further than the center portions of said first mentioned spring elements when the displacement of said support members relative to each other is less than said maximum displacement.

2. A seat structure comprising a main frame and an auxiliary frame,
  a plurality of elongated spring elements having fishmouth end portions,
  said auxiliary frame being supported in spaced relationship to said main frame by said fishmouth end portions,
  said elongated spring elements being disposed in substantially parallel rleationship to each other and having the center portions thereof arched outwardly from the plane of said auxiliary frame,
  at least one additional spring element interposed between a pair of said first mentioned spring elements and having its center portion arched outwardly from the plane of said auxiliary frame,
  said additional spring element being supported at each of its ends on support members movable for displacement of said ends longitudinally of said additional spring element,
  and means operative to move said support members to displace said additional spring element ends toward or from each other to vary the arch of said additional spring element,
  the arch of the center portion of said additional spring element when its ends are at a maximum displacement from each other being substantially the same as that of the center portions of said first mentioned spring elements,
  the center portion of said additional spring element being arched outwardly from the plane of said auxiliary frame member further than the center portions of said first mentioned spring elements when the displacement of said additional spring elements relative to each other is less than said maximum displacement.

3. A seat structure comprising a main frame and an auxiliary frame,
  a plurality of spring elements having fishmouth end portions.
  said auxiliary frame being supported in spaced relationship to said main frame by said fishmouth end portions,
  said spring elements being disposed in substantially parallel relationship to each other and having the center portions thereof curved outwardly from the plane of said auxiliary frame,
  at least one additional spring element interposed between a pair of said first mentioned spring elements,
  said additional spring element being attached at each end thereof to a slide member, respectively,
  means supporting said slide members for movement longitudinally of said additional spring element,
  and means operative to move said slide members toward or from each other to vary the curvature of said additional spring element,
  the curvature of the center portion of said additional spring element when said slide members are at a maximum displacement from each other being substantially the same as that of the center portions of said first mentioned spring elements,
  said additional spring element center portion being curved outwardly from the plane of said auxiliary frame member further than the center portions of said first mentioned spring elements when the displacement of said slide members relative to each other is less than said maximum displacement.

4. A seat structure according to claim 3 in which the means supporting said slide members comprises track means extending between opposite side members of said main frame.

5. A seat structure according to claim 4 in which the means operative to move said slide members comprises a threaded spindle means within said track means threadedly engaged with said slide members,
  and means operative to rotate said spindle means.

References Cited in the file of this patent

UNITED STATES PATENTS

| 1,811,299 | Brockhaus | June 23, 1931 |
| 2,874,390 | Stone | Feb. 24, 1959 |

FOREIGN PATENTS

| 209,160 | Great Britain | Jan. 3, 1924 |